US010313891B2

(12) United States Patent
MacMullan et al.

(10) Patent No.: US 10,313,891 B2
(45) Date of Patent: *Jun. 4, 2019

(54) SPECTRUM SHARING BETWEEN PRIMARY USERS AND CO-EXISTENCE GROUPS OF SECONDARY USERS

(71) Applicant: Federated Wireless, Inc., Arlington, VA (US)

(72) Inventors: Samuel J. MacMullan, Carlisle, MA (US); Masoud Olfat, Alrington, VA (US); Deepak Das, Arlington, VA (US); Pirouz Zarrinkhat, Mountain View, CA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,260

(22) Filed: Sep. 4, 2018

(65) Prior Publication Data

US 2018/0376345 A1 Dec. 27, 2018

Related U.S. Application Data

(63) Continuation of application No. 15/900,151, filed on Feb. 20, 2018, now Pat. No. 10,098,005.

(Continued)

(51) Int. Cl.
*H04W 16/14* (2009.01)
*H04W 16/18* (2009.01)
(Continued)

(52) U.S. Cl.
CPC .......... *H04W 16/14* (2013.01); *H04B 17/102* (2015.01); *H04W 16/18* (2013.01);
(Continued)

(58) Field of Classification Search
CPC ............. H04W 16/14; H04W 72/0453; H04W 72/048; H04W 16/18; H04W 72/082; H04W 52/243
See application file for complete search history.

(56) References Cited

U.S. PATENT DOCUMENTS 7,477,610 B2 * 1/2009 Bejerano ............... H04W 28/16
370/252
9,094,836 B2 * 7/2015 Lee ....................... H04W 16/14
(Continued)

*Primary Examiner* — Nathan A Mitchell
(74) *Attorney, Agent, or Firm* — Finnegan, Henderson, Farabow, Garrett & Dunner LLP

(57) ABSTRACT

Embodiments assign shared spectrum resources to access points. Embodiments group the access points into coexistence groups of access points, and generate a vertex graph including vertices that each represent one of the coexistence groups, where an edge connecting a pair of vertices in the vertex graph represents an overlap between coverage contours of a pair of coexistence groups represented by the pair of vertices, and the edge is assigned a weight that is proportional to the overlap as compared to other overlaps between coverage contours of other pairs of coexistence groups. Embodiments generate at least one vertex-colored graph by assigning a color to each vertex in the vertex graph, group the coexistence groups into groups of coexistence groups based on their corresponding assigned colors in the at least one vertex-colored graph, and map shared spectrum transmit frequencies to the groups of coexistence groups.

23 Claims, 7 Drawing Sheets

Related U.S. Application Data

(60) Provisional application No. 62/600,489, filed on Feb. 22, 2017.

(51) Int. Cl.
| | |
|---|---|
| *H04W 52/24* | (2009.01) |
| *H04W 72/08* | (2009.01) |
| *H04W 72/04* | (2009.01) |
| *H04W 52/36* | (2009.01) |
| *H04B 17/10* | (2015.01) |

(52) U.S. Cl.
CPC ....... *H04W 52/243* (2013.01); *H04W 52/367* (2013.01); *H04W 72/048* (2013.01); *H04W 72/0453* (2013.01); *H04W 72/082* (2013.01)

(56) References Cited

U.S. PATENT DOCUMENTS

| | | | |
|---|---|---|---|
| 2009/0196180 A1* | 8/2009 | Bahl | H04L 5/0032 370/235 |
| 2013/0142129 A1* | 6/2013 | Rinne | H04W 24/00 370/329 |
| 2014/0219197 A1* | 8/2014 | Chaudhuri | H04W 52/243 370/329 |
| 2016/0135117 A1* | 5/2016 | Kang | H04W 16/14 370/216 |
| 2016/0262024 A1* | 9/2016 | Freda | H04W 72/0453 |
| 2017/0332382 A1* | 11/2017 | Guo | H04W 16/22 |
| 2018/0014304 A1* | 1/2018 | Khoshnevisan | H04W 24/08 |
| 2018/0042018 A1* | 2/2018 | Bhushan | H04W 56/0015 |
| 2018/0063844 A1* | 3/2018 | Khoshnevisan | H04W 72/0453 |

\* cited by examiner

SPECTRUM SHARING BETWEEN PRIMARY USERS AND CO-EXISTENCE GROUPS OF SECONDARY USERS

CROSS-REFERENCE TO RELATED APPLICATIONS

This Application claims the benefit of U.S. Nonprovisional application Ser. No. 15/900,151, filed Feb. 20, 2018 and issued as U.S. Pat. No. 10,098,005, which claims the benefit of Provisional Application 62/600,489 (filed Feb. 22, 2017), each of which Application is incorporated herein by reference in its entirety.

FIELD

The present disclosure generally relates to wireless communication, and more specifically, to wireless spectrum sharing and interference management.

BACKGROUND

Wireless communication refers to communicating voice, data, or any other information over a wireless medium such as air. Unlike wired mediums which are available only to transmitters/receivers that are physically connected to the medium, a wireless medium is inherently open and shared. Therefore, certain frequency bands (also referred to as bands, frequencies, frequency channels, or channels) of a wireless medium may be dedicated to certain users in order to guarantee communication quality and bandwidth availability. The demand for wireless spectrum has been continuously increasing with the increase in the number of wireless users (e.g., commercial cellular operators). One way to address this demand is to open the bands that have been previously dedicated to certain users. An example is the 3550-3700 MHz band (the 3.5 GHz band) which was previously reserved for military use but has been opened by the U.S. Federal Communications Commission ("FCC") for shared use. Similarly, the 1695-1710 MHz, 175-51780 MHz, and 2155-2180 MHz bands (the "AWS-3" bands) have also been considered for shared use whenever federal incumbent systems relocate out of them.

When sharing spectrum, the users of the shared spectrum (e.g., federal and non-federal incumbent systems, access points of commercial cellular operators, etc.) should not interfere with one another, and in case of a usage conflict, higher priority users should be guaranteed access to the shared spectrum. In the 3.5 GHz band, the FCC has defined a three-tiered model of users, where incumbent users (e.g., federal and non-federal incumbent systems) are positioned at the top tier and have the highest priority, while public users (e.g., commercial cellular operators, emergency vehicles, police, etc.) are positioned at either a middle tier or a bottom tier. Specifically, some public users may obtain higher priority under a Priority Access License ("PAL") and be positioned in the middle tier and have medium priority, while other public users may operate without a license under General Authorized Access ("GAA") and be positioned in the bottom tier and have the lowest priority. Each PAL and GAA public use device may implement a communication system that operates according to a wireless communication technology or standard protocol (e.g., Long Term Evolution ("LTE"), Wideband Code Division Multiple Access ("WCDMA"), Global System for Mobile Communications ("GSM"), etc.) to communicate with one or more end user devices (e.g., smartphones).

One or more Spectrum Access Systems ("SASs") may facilitate spectrum sharing among the incumbent and public users. The SASs monitor interference and dynamically assign frequency bands to various devices that consume shared spectrum resources such that devices with a lower priority do not interfere with those with a higher priority.

SUMMARY

Embodiments provide methods, systems, and computer-readable medium for assigning shared spectrum resources to access points that provide the resources to end users such as smartphone or other devices. Embodiments group the access points into coexistence groups of access points, and generate a vertex graph including vertices that each represent one of the coexistence groups, where an edge connecting a pair of vertices in the vertex graph represents an overlap between coverage contours of a pair of coexistence groups represented by the pair of vertices, and the edge is assigned a weight that is proportional to the overlap as compared to other overlaps between coverage contours of other pairs of coexistence groups. One embodiment generates at least one vertex-colored graph by assigning a color to each vertex in the vertex graph, groups the coexistence groups into groups of coexistence groups based on their corresponding assigned colors in the at least one vertex-colored graph, and maps shared spectrum transmit frequencies to the groups of coexistence groups, where each access point in a group of coexistence groups is configured to transmit using a transmit frequency that is assigned to the group of coexistence groups by the mapping. However, using colors for grouping coexistence groups as represented by vertices in a graph is only one possible abstraction method, and alternative embodiments may group such vertices using other abstraction methods, e.g., by assigning labels, letters, etc.

One embodiment provides a computer-readable medium storing instructions that, when executed by a processor, cause the processor to assign shared spectrum resources to access points. The assigning includes grouping the access points into coexistence groups of access points; generating a vertex graph including vertices that each represent one of the coexistence groups, where an edge connecting a pair of vertices in the vertex graph represents an overlap between coverage contours of a pair of coexistence groups represented by the pair of vertices, where the edge is assigned a weight that is proportional to the overlap as compared to other overlaps between coverage contours of other pairs of coexistence groups; generating at least one vertex-colored graph by assigning a color to each vertex in the vertex graph; grouping the coexistence groups into groups of coexistence groups based on their corresponding assigned colors in the at least one vertex-colored graph; and mapping shared spectrum transmit frequencies to the groups of coexistence groups, where each access point in a group of coexistence groups is configured to transmit using a transmit frequency that is assigned to the group of coexistence groups by the mapping.

One embodiment provides a network system including one or more servers and two or more Spectrum Access Systems ("SASs") implemented as software modules hosted on the one or more servers, where the two or more SASs are configured to communicate with each other and with access points to assign shared spectrum resources to the access points, the assigning including: grouping the access points into coexistence groups of access points; generating a vertex graph including vertices that each represent one of the coexistence groups, where an edge connecting a pair of vertices in the vertex graph represents an overlap between coverage contours of a pair of coexistence groups represented by the pair of vertices, where the edge is assigned a weight that is proportional to the overlap as compared to other overlaps between coverage contours of other pairs of coexistence groups; generating at least one vertex-colored graph by assigning a color to each vertex in the vertex graph; grouping the coexistence groups into groups of coexistence groups based on their corresponding assigned colors in the at least one vertex-colored graph; and mapping shared spectrum transmit frequencies to the groups of coexistence groups, wherein each access point in a group of coexistence groups is configured to transmit using a transmit frequency that is assigned to the group of coexistence groups by the mapping

BRIEF DESCRIPTION OF THE DRAWINGS

The accompanying drawings are incorporated in and constitute part of this specification, and together with the description, illustrate and serve to explain various embodiments.

DETAILED DESCRIPTION

Figure 1:
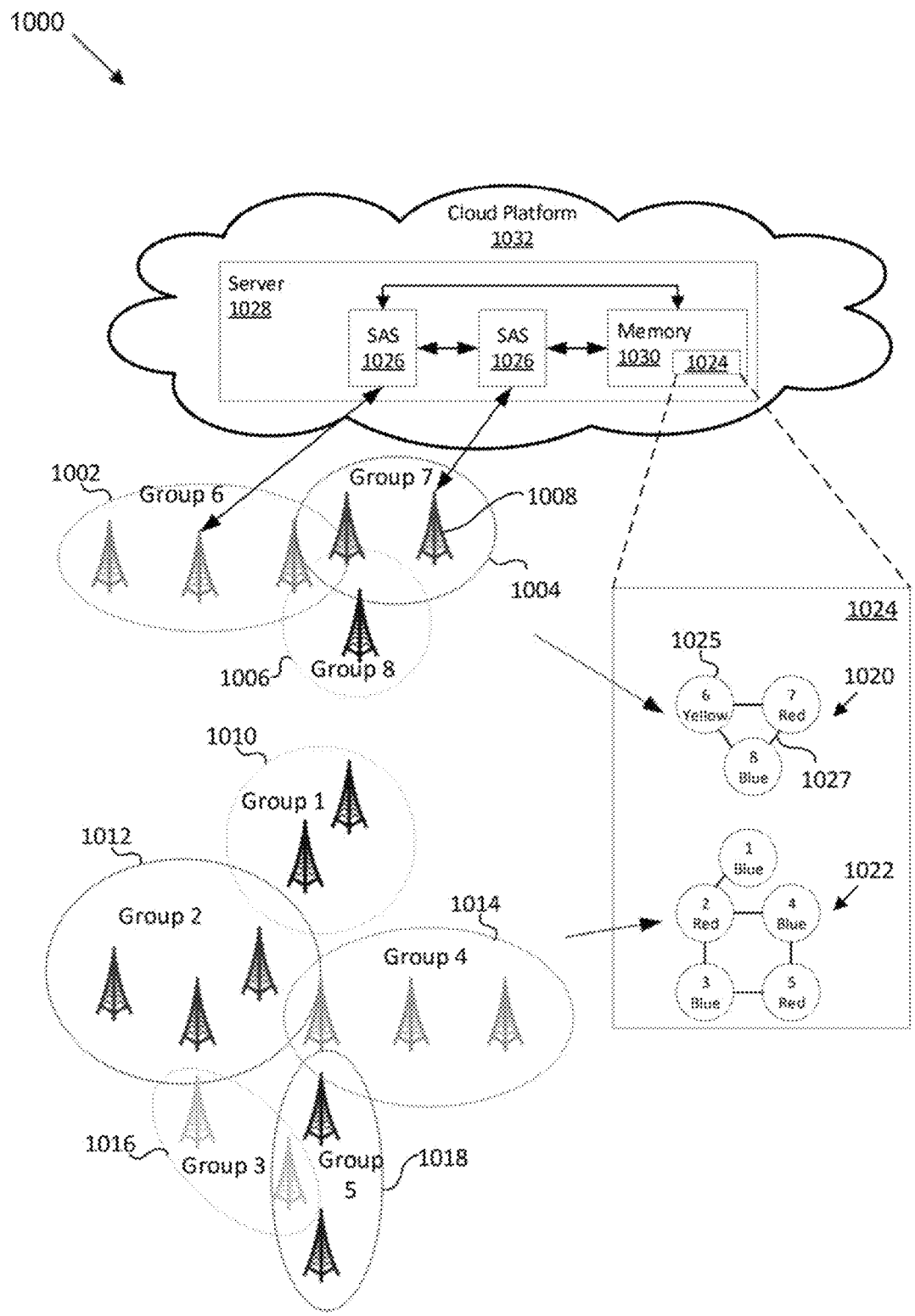
FIG. 1 illustrates a system for forming a vertex-colored graph of coexistence groups of access point, according to an embodiment of the disclosed subject matter.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Embodiments described herein allow for spectrum sharing between incumbent users and coexistence groups of secondary users. Embodiments generate a vertex-colored graph including vertices that each represent a coexistence group of access points and use the vertex-colored graph to group the coexistence groups so that access points in each group of coexistence groups can be assigned the same frequency of the shared spectrum. One embodiment defines an objective function that accounts for objectives such as access point bandwidth and coverage areas, costs related to interference and switching, and constraints such as minimum access point bandwidth and power. The embodiment uses the objective function along with the vertex-colored graph to perform power and frequency assignment over coexistence groups of access points. Accordingly, embodiments allow for more efficient spectrum sharing.

Coexistence Groups

In shared spectrum environments involving incumbent users (primary users) and secondary users, secondary user system resources such as bandwidth and power may be allocated by a Spectrum Access System ("SAS") such that incumbent protection, secondary user fairness, spectrum efficiency (e.g., $bps/Hz/km^2$), and Quality of Service ("QoS", e.g., interference, stability, etc.) are ensured. A SAS may be implemented as software modules hosted on servers which may be on one or more cloud platforms. A cloud platform may include a distributed system having one or more software processes executed over a local or distributed network using at least one computer server or other computer hardware, as described below with reference to an example embodiment illustrated in FIG. 1. The hardware may include computing devices (e.g., desktops, workstations, etc.), handheld computing devices, memory devices, network components, and/or interface components, which allow for network-based computing and shared resources over a distributed network. Cloud services are trusted by many of the largest federal and commercial enterprises in part because of the robust controls available to maintain security and data protection on a cloud platform. A cloud platform also provides flexibility with respect to resource allocation and remote access. The SAS receives information about components of a wireless environment (e.g., base stations, wireless users, other SASs, requests by incumbent users for exclusive use, etc.) and allocates shared spectrum resources to various users/devices in the wireless environment accordingly.

In some embodiments, secondary users may operate as part of a "coexistence group". A coexistence group is a network or set of access points managed by a certain operator, where the access points in the coexistence group desire a common frequency assignment from the SAS. In one embodiment, the mutual interference and channel assignments of the collection of Citizens Broadband radio Service Devices ("CBSDs") and/or networks in a coexistence group are coordinated by the SAS using a set of coexistence policies. Each coexistence group is defined under the constituency of a SAS, and coordination of coexistence groups defined under different SASs is performed through SAS-to-SAS interface. In one embodiment, coexistence group spectrum management policies are common across all SASs in order to address consistency and transparency requirements. To that end, the SASs share their views of their coexistence groups to obtain a common view of the environment. An example of the policies/methods based on which coexistence groups are mapped to channels is graph coloring as disclosed herein with reference to various embodiments.

In some embodiments, if multiple SASs are contending for a common shared spectrum resource pool, the SASs need to coordinate with one another since one SAS's frequency assignments impact all others, and interference aggregated across the SASs needs to be controlled to ensure incumbent protection.

In some embodiments, coexistence groups that do not interfere with one another may use the same frequency/frequencies, thus leading to improved spectrum efficiency. In some embodiments, a coexistence group is not assigned frequencies that are the same as nearby incumbents. In some embodiments, resource assignments (e.g., transmit power assignments) across coexistence groups are made in some fair way, e.g., proportional to the number of access points in a coexistence group.

Graph Coloring

In some embodiments, the SASs perform resource allocation across the coexistence groups by generating a vertex-colored graph based on the coverage contours of each of the coexistence groups. However, vertex coloring is only one possible abstraction method, and alternative embodiments may use other abstraction methods (such as assigning labels or letters to the vertices) and use such alternative abstraction methods in a same or similar manner as a vertex-colored graph described below. A vertex-colored graph is made of one or more vertices, where each vertex may be connected by an edge to one or more other vertices, and each vertex is assigned a color such that no edge is connecting two vertices that have the same assigned color. In one embodiment, for example, the coverage contour of a coexistence group may be the union of SAS-determined individual downlink coverage areas of the access points in that coexistence group. The SAS may generate the vertex-colored graph such that each coexistence group is represented as a vertex in the vertex-colored graph, and two vertices of the graph are connected if the coverage contours of their corresponding coexistence groups overlap. The SAS may then assign a color to each vertex by using any known graph coloring method apparent to a person skilled in the relevant arts. In one embodiment, for example, the SAS may implement any known "minimum vertex coloring" method to color the vertices using the fewest number of colors such that no edge is connecting two vertices that have the same assigned color.

FIG. 1 illustrates a system 1000 for forming a vertex-colored graph 1024 by one or more SASs 1026 based on coverage contours 1002, 1004, 1006, 1010, 1012, 1014, 1016, 1018 of eight coexistence groups that each include one or more access points 1008. Each of the SASs 1026 may be implemented as one or more software modules hosted on a cloud platform 1032 and executed by a server 1028 in the cloud platform 1032. Although the SASs 1026 in the embodiment of FIG. 1 are illustrated as being hosted on and executed by the same server 1028, in alternative embodiments, the SASs 1026 may be hosted on separate servers and/or executed by more than one server or by a network of distributed servers. The SASs 1026 communicate with respective access point 1008 to generate the vertex-colored graph 1024 and store it on a memory 1030 in the cloud platform 1032. The vertex-colored graph 1024 is made of vertices 1025 and edges 1027, where each vertex represents one of the eight coexistence groups, and each edge represents an overlap between coverage contours of coexistence groups represented by the vertices that are connected by that edge.

Due to the coverage contour overlap configuration in the example of FIG. 1, the vertex-colored graph 1024 includes two separate connected sets of vertices: a first connected set 1020 and a second connected set 1022. A connected set of vertices is a set of vertices in which each vertex is connected to at least one other vertex in the connected set. The first connected set 1020 includes those vertices that represent coexistence groups 6, 7, and 8, while the second connected set 1022 includes those vertices that represent coexistence groups 1, 2, 3, 4, and 5.

The first connected set 1020 and the second connected set 1022 are separate from each other since there is no coverage contour overlap between the coexistence groups represented by vertices in the first connected set 1020 and the coexistence groups represented by vertices in the second connected set 1022. Accordingly, disconnected portions of the vertex-colored graph 1024 allow for partitioning of the coexistence groups into those represented by the first connected set 1020 and those represented by the second connected set 1022 such that each connected set represents a set of coexistence groups that can be considered independently in shared spectrum resource assignment because the collective coverage area represented by the first connected set 1020 does not interfere with the collective coverage area represented by the second connected set 1022 and vice-versa. That is, the set of coexistence groups represented by each connected set can reuse the entirety of the available shared spectrum, assuming that incumbent protection is guaranteed.

Figure 2:
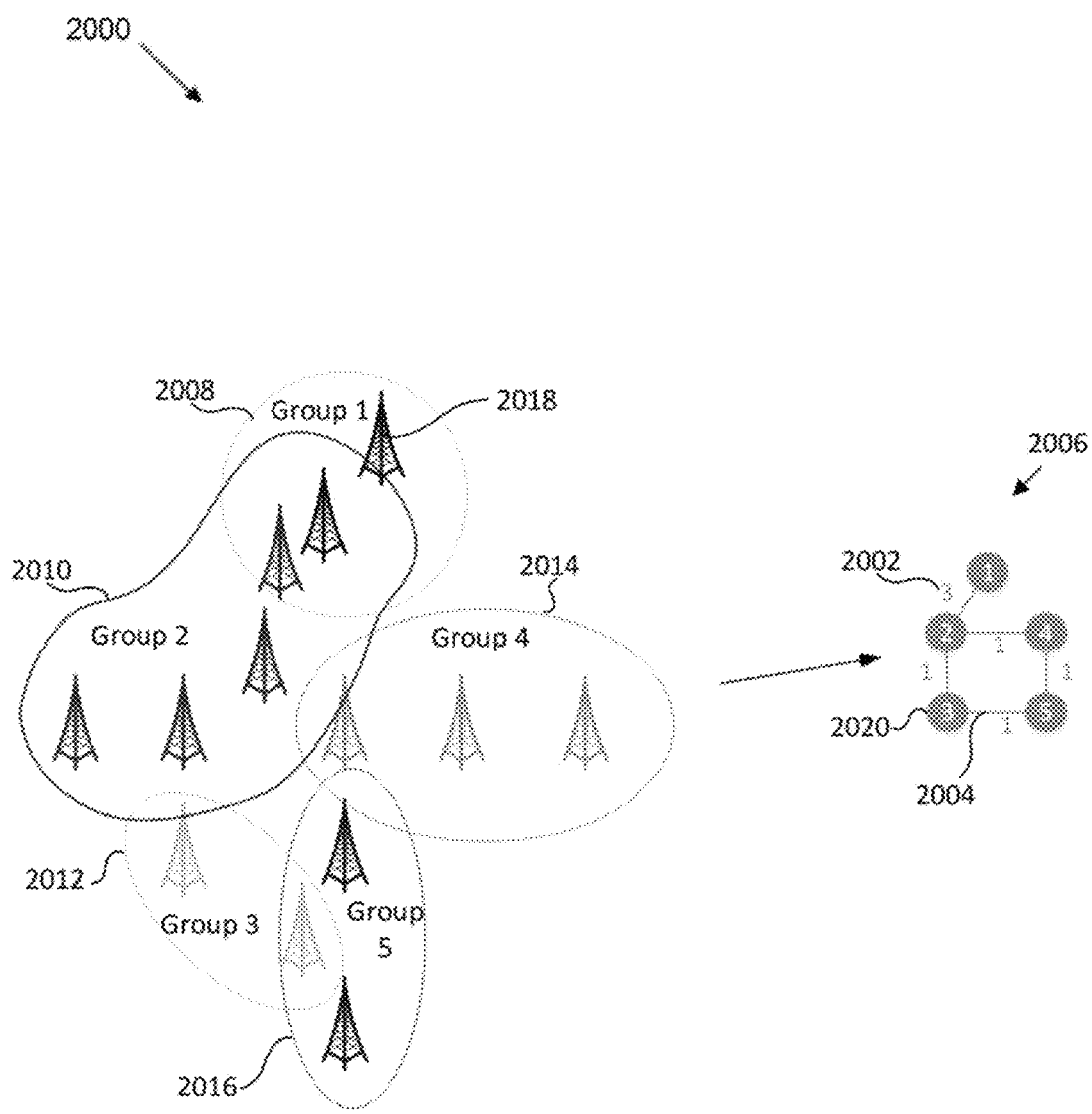
FIG. 2 illustrates a schematic diagram for assigning weights to edges in a vertex-colored graph of coexistence groups of access point, according to an embodiment of the disclosed subject matter.

In some embodiments, a weight may be assigned to each edge in a vertex-colored graph to indicate a relative amount of interference between the pair of coexistence groups represented by the vertices that are connected by that edge, as compared to the other edges. In one embodiment, for example, the amount of interference indicated by a weight assigned to an edge may be proportional to the amount of overlap in the coverage areas of the two coexistence groups represented by the vertices that are connected by that edge. FIG. 2 illustrates a schematic diagram 2000 for assigning weights 2002 to edges 2004 that connect vertices 2020 of a vertex-colored graph 2006 formed based on coverage contours 2008, 2010, 2012, 2014, 2016 of five coexistence groups that each include one or more access points 2018 (the colors assigned to each vertex of the vertex-colored graph 2004 are not illustrated in FIG. 2). In the example of FIG. 2, since the coverage contours of coexistence groups 1 and 2 have about three times the overlap area of the coverage contours of any other pair of overlapping coexistence groups (e.g., coexistence groups 3 and 5), the weight assigned to the edge that connects the vertices that represent coexistence groups 1 and 2 in the vertex-colored graph 2006 is "3" while the other edges are assigned a weight of "1".

Resource Assignment Optimization

After generating a vertex-colored graph based on the coverage contours of the coexistence groups of access points, the SASs may use the vertex-colored graph along with an objective function to determine an optimum assignment of shared spectrum resources to a set of secondary users that request access to such resources. In some embodiments, for example, the objective function may have as objectives the bandwidth assigned to each access point and the coverage area achieved by each access point. The coverage area may be calculated based on the access point downlink using any SAS-standardized propagation model known in the relevant arts. Alternatively or additionally, the objective function may account for costs such as the interference between coexistence groups, for example, based on the weights assigned to the edges connecting vertices representing coexistence groups in the vertex-colored graph. Alternatively or additionally, if it is desirable to maintain network stability (i.e., not require access points to change channels or power assignments), the objective function may account for the cost of "switching" to capture the negative impact of a candidate assignment requiring some access points to switch channels or power assignments. Alternatively or additionally, the objective function may account for constraints such as incumbent protection and any guard bands that may be needed between frequency assignments to access points. Alternatively or additionally, the objective function may account for fairness considerations that may demand a certain minimum assignment of shared spectrum resources to each coexistence group, such as a minimum bandwidth assignment and a minimum transmit power level for each access point.

In one embodiment, for example, the objective function may be formed as:

$$f_{BW}(\Sigma BW_i) + f_{CA}(\Sigma CA_i) - \Sigma f_j(C_j)$$

where $BW_i$ is the $i^{th}$ access point bandwidth, $f_{BW}$ is a function of the sum of the access point bandwidths, $CA_i$ is the $i^{th}$ access point coverage area, $f_{CA}$ is a function of the sum of the access point coverage areas, and $f_j$ is a function of the $j^{th}$ cost $C_j$. The functions $f_{BW}$, $f_{CA}$, and $f_j$ may be selected based on the relative importance of their corresponding objective (i.e., bandwidth or coverage area) or cost. In one embodiment, for example, one or more of these functions may be a linear function of the corresponding objective/cost. In alternative embodiments, one or more of these functions may be a more complicated function such as a step function or an exponential function.

In one embodiment, for example, the criteria used for forming the objective function may include objectives, costs, and constraints, where the objectives include assigned bandwidths $BW_i$ and coverage areas $CA_i$, the costs include the cost of interference $C_I$ (e.g., proportional to the coverage area overlap of coexistence groups) and the cost of CBSD channel switching $C_S$, and the constraints include minimum access point bandwidth and power assignments considering fairness, incumbent protection, and guard bands. However, the objective function for shared spectrum resource assignment optimization may be formed using alternative and/or additional objectives, costs, and constraints as would be apparent to one skilled in the relevant arts.

In some embodiments, in order to reduce disruptions, shared spectrum resource assignment optimization may be applied periodically (e.g., once per day/week), and access point channel/power assignment changes are made only if such changes provide significant improvement over the current state. In these embodiments, some headroom may be allocated on each SAS so that the SAS may temporarily assign frequency and transmit power to CBSDs that request grants between the periodic updates. If there are no new CBSDs requesting service during the interval between updates, the headroom may be applied to existing CBSDs under some fairness considerations.

Coordinated Resource Assignment

In some embodiments, multiple SASs may generate a same/common vertex-colored graph of coexistence groups of access points and apply the same objective function to obtain coordinated shared spectrum resource assignment over the access points. In these embodiments, the SASs may share information relevant to the coordinated shared spectrum resource assignments and agree on coordination policies to quantify the amount of interference between coexistence groups of access points, and therefore operate as a collective SAS with information about all access points and coexistence groups and agreed upon methods for coordinated interference management. In one embodiment, for example, the coordinated information may include the interference weights between coexistence groups of access points.

In one embodiment, the SASs coordinate on a policy (reconciliation process) to quantify the interference weights. For example, in one embodiment, if there are two SASs managing access points within each of two coexistence groups, each SAS calculates an estimate of the interference weight between the two coexistence groups, and the SASs then use an agreed upon reconciliation process (e.g., coordinated weight is the average of each SAS's interference weight estimate) to determine the interference weight used in coexistence calculations by both SASs collectively.

The coordinated information may allow each SAS to generate the same vertex-colored graph of coexistence groups of access points. In one embodiment, if a single SAS manages all the access points in a connected set, SAS-to-SAS coordination is not required to ensure incumbent/primary user protection, and therefore that single SAS may use any optimization method it desires so long as the optimization method satisfies any required fairness constraints.

Suboptimum Resource Assignment

In some embodiments, finding the shared spectrum resource assignments that optimize the objective function is a Nondeterministic Polynomial Time ("NP")-complete problem requiring an exhaustive search over candidate solutions. If there are only a small number of access points, an exhaustive search for the best shared spectrum resource allocation given an NP-complete objective function may be practically implemented and thus desired. However, in many circumstances (e.g., when the number of access points is large), an exhaustive search across all resource assignment options is prohibitively complex, hence a suboptimum approach using a reduced search space may be needed. In one embodiment, for example, only a subset of the resource assignment options is considered. In some embodiments, the search space may be reduced to a small number of candidate solutions to be investigated, and the reduced search space typically includes a solution that is optimum or close to optimum.

Grouping of Coexistence Groups

In some embodiments, the search space for finding a solution to optimize the objective function may be reduced by grouping the coexistence groups. The following embodiments describe some example grouping options. However, other variations or extensions to the following embodiments to provide additional candidates for consideration would be apparent to those skilled in the relevant arts.

In one embodiment, in each connected set in the vertex-colored graph of the coexistence groups of access points, the represented coexistence groups may be grouped according to their assigned colors in the vertex-colored graph such that the coexistence groups with the same assigned color are grouped together. Since there is an edge connecting each pair of coexistence groups that have coverage overlap, any pair of overlapping coexistence groups have different assigned colors and therefore are not grouped together. Accordingly, grouping the coexistence groups that have the same assigned color results in non-overlapping coexistence groups to be grouped together.

In one embodiment, the number of different colors assigned to the vertices in the vertex-colored graph of coexistence groups of access points is the chromatic number which is the smallest number of colors needed to color the vertices of the graph so that no two adjacent vertices are assigned the same color. Obtaining vertex colorings corresponding to the chromatic number may be performed according to any algorithms known to those skilled in the relevant arts. The resulting vertex-colored graph may then be used for shared spectrum resource optimization in any of the embodiments described herein. If there are multiple options for vertex coloring corresponding to the chromatic number, each of the options may be considered as a candidate for obtaining shared spectrum resource assignment.

In some embodiments, since the shared spectrum is reused in each connected set, it may be advantageous from a spectrum efficiency perspective to form as many connected sets as possible. Accordingly, a minimum cut or any other similar functionality may be used to form additional connected sets in the vertex-colored graph. A minimum cut of a graph is the cut with the lowest cost in terms of the weights that would be removed because of removing the corresponding connections/edges when the graph is split by the cut. Once the minimum cut is performed, a graph coloring scheme such as a minimum coloring (i.e., coloring using the chromatic number of colors) may be used to provide candidate options for obtaining shared spectrum resource assignment.

Figure 3:
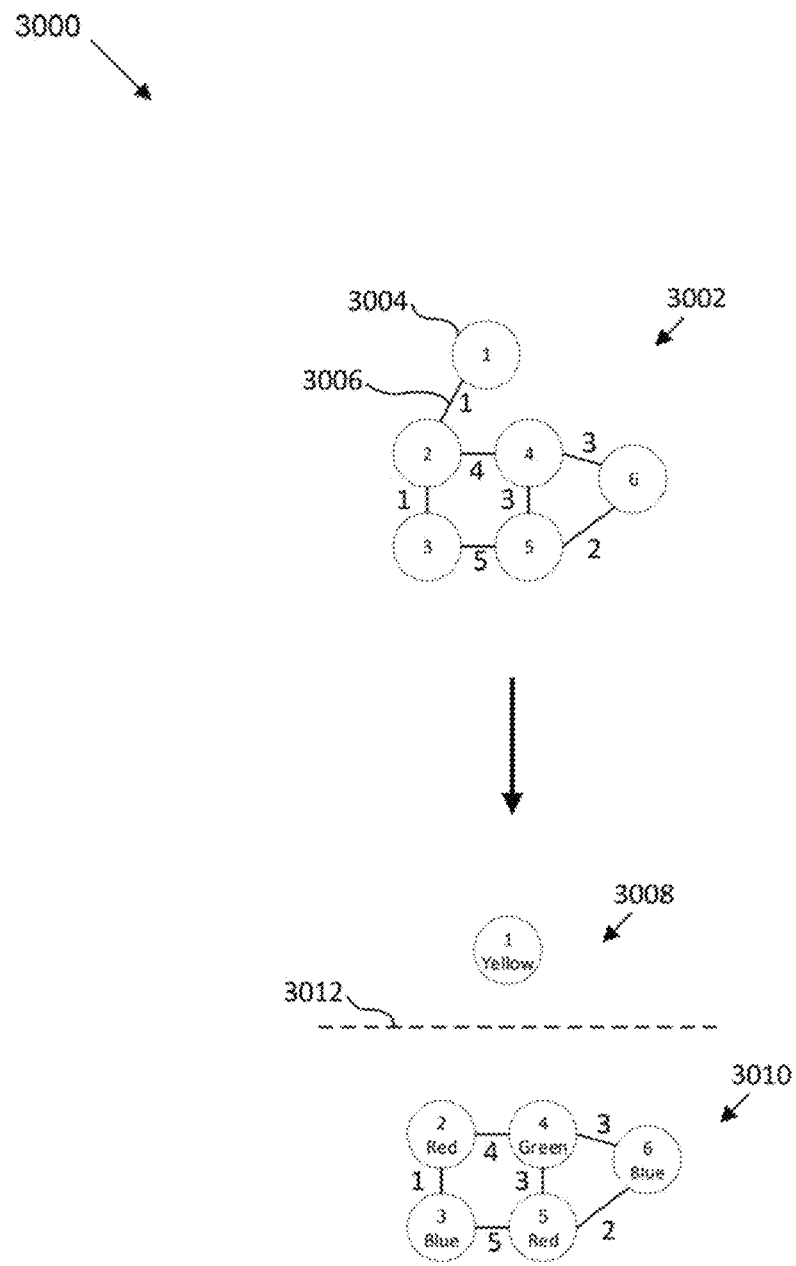
FIG. 3 illustrates a schematic diagram for performing a cut on a vertex-colored graph of coexistence groups of access point, according to an embodiment of the disclosed subject matter.

FIG. 3 illustrates a schematic diagram 3000 for dividing an original 6-vertex connected set 3002, including vertices 3004 connected by weighted edges 3006, into a single-vertex connected set 3008 and a 5-vertex connected set 3010 by applying a minimum cut 3012, and then applying minimum graph coloring to the single-vertex connected set 3008 and to the 5-vertex connected set 3010 separately. In this example, the cost of the minimum cut 3012 is "1" since the single edge that is removed by the minimum cut 3010 has a weight of "1".

In some embodiments, when additional users request assignment of shared spectrum resources, the cost of switching the resource assignments of the existing users may be significant, and therefore staying with the current assignments may be desirable. Accordingly, these embodiments include the current assignments as an option in the optimization of shared spectrum resource assignments.

Some embodiments perform shared spectrum resource optimization by including, as additional options, "chromatic number plus 1" colors to obtain the colored-vertex graph, and/or splitting the colored-vertex graph by cuts with overall removed weights that are the second smallest compared to the minimum cut. These embodiments may result in smaller groups of coexistence groups (in terms of the number of access points in each group of coexistence groups) and hence a reduced search space for shared spectrum resource assignment optimization.

Mapping of Groupings to Specific Frequencies

In any of the disclosed embodiments, after forming groups of coexistence groups (e.g., such that there is no coverage area overlap between any two coexistence groups that are grouped together), the objective function may be used to determine the best mapping of groupings to frequencies. For example, if there are incumbents (primary users) such as fixed satellite service ("FSS") earth stations and/or Priority Access License ("PAL") Protection Areas ("PPAs"), the mapping of frequencies may be performed to maximize the objectives in terms of bandwidth and coverage while ensuring protection of the incumbents. The objective function may be used to compare various options and optimize the shared spectrum resource assignments accordingly.

Figure 4:
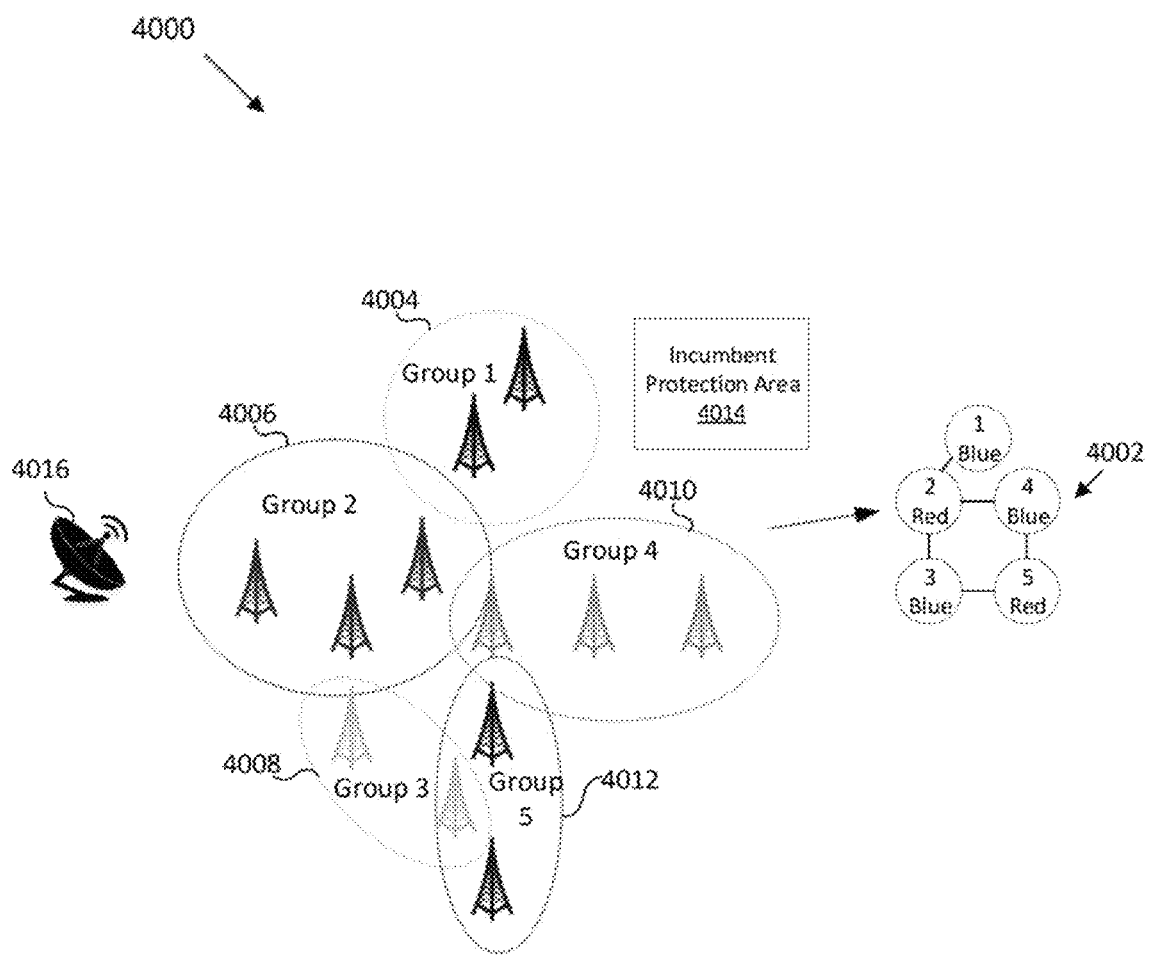
FIG. 4 illustrates a schematic diagram for assigning specific frequencies to groupings of coexistence groups of access point, according to an embodiment of the disclosed subject matter.

FIG. 4 illustrates a schematic diagram 4000 of an example embodiment for assigning specific frequencies to groupings of coexistence groups 1, 2, 3, 4, and 5 with respective coverage areas 4004, 4006, 4008, 4010, and 4012. In this example, an FSS earth station 4016 operates on frequency $f_1$ near coexistence group 2, while a PAL (not shown) or incumbent protection area 4014 (e.g., PPA) operates on frequency $f_2$ near coexistence groups 1 and 4. In one embodiment, the incumbent protection area 4014 and the protected FSS earth station 4016 are external to the shared spectrum region. The optimum shared spectrum assignment may be obtained by: first performing a minimum coloring to obtain the vertex-colored graph 4002 where coexistence groups 1, 3, and 4 are assigned the color blue and are therefore grouped together (the blue group) while coexistence groups 2 and 5 are assigned the color red and are therefore grouped together (the red group); and then assigning $f_2$ to the red group (which does not include coexistence groups 1 and 4) and $f_1$ to the blue group (which does not include coexistence group 2).

In an alternative embodiment, a suboptimum approach for shared spectrum assignment optimization includes grouping coexistence groups of access points and mapping these groupings to a number of frequencies to maximize an objective function while ignoring incumbent interference constraints and/or allowing a remapping of individual access point power levels after the application of the optimization criteria. One such suboptimum approach includes equal partitioning of the interference budget over the access points and then performing reverse water filling of the Effective Isotropic Radiated Power ("EIRP") deficit of the access points as described in detail below. In one embodiment, the EIRP of a radio transmitter is defined as the product of its transmit power and the antenna gain in a given direction relative to that of an isotropic antenna.

In one embodiment, groups of coexistence groups of access points are mapped to frequencies without considering any incumbent protection, and thereafter, access point power levels are adjusted to ensure that incumbents are protected from secondary user aggregate interference while some fairness criteria are also satisfied. For example, in one embodiment, if there are N access points capable, if operating at their maximum permissible power level, to cause harmful interference to an incumbent, a fair method to ensure incumbent protection is to first allow each access point to contribute 1/N to the overall aggregate interference at the incumbent. Under this measure of fairness, the closer an access point is to the incumbent, the lower is the maximum transmit power level of the access point. Since some access points may be incapable of reaching the 1/N level of interference at the incumbent, it may be possible to allow some other access points to cause more than the 1/N level of interference at the incumbent. That is, some leftover margin will exist that can be reassigned to other access points while still protecting the incumbent.

Figure 5:
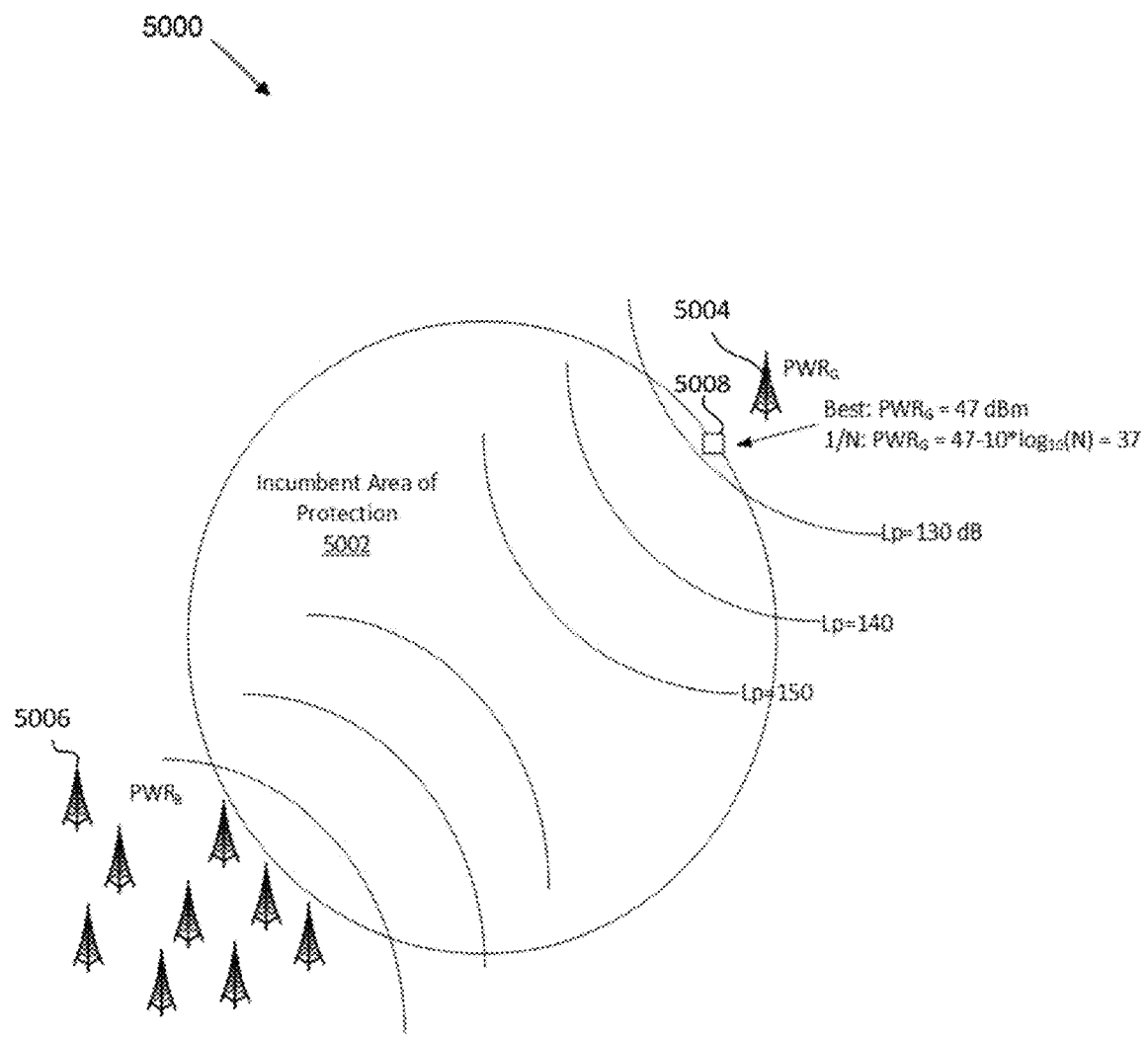
FIG. 5 illustrates a schematic diagram for controlling power levels of various access points to limit aggregate interference levels in an incumbent area of protection, according to an embodiment of the disclosed subject matter.

For an access point that is close to the incumbent, requiring the access point to contribute 1/N to the overall aggregate interference at the incumbent may force the access point to operate at a power level that is much lower than its maximum permissible power level. In some cases, such requirement may lead to an unacceptably small access point coverage area for access points that are too close to the incumbent. FIG. 5 illustrates a schematic diagram 5000 where the power level $PWR_G$ of a green access point 5004 (a single access point belonging to a green group) and the power levels $PWR_B$ of nine blue access points 5006 (nine access points belonging to a blue group) are controlled to limit the aggregate interference levels in an incumbent area of protection 5002. In this example, the total number of access points N is 9+1=10, therefore each access point is allowed to contribute $1/N=1/10$ to the aggregate interference in the incumbent area of protection 5002. The green access point 5004 is very close to location 5008 in the incumbent area of protection 5002. In order for it to contribute 1/N to the aggregate interference at location 5008, the green access point 5004 in this example is forced to operate at 37 dBm/10 MHz which is 10 dB below its otherwise maximum permissible power level of 47 dBm. This results in a coverage area deficit for the green access point 5004. Meanwhile, the interference contribution from the blue access points 5006 at location 5008 is negligible due to their longer distance from location 5008. Thus, it is possible and preferable to allow the green access point 5004 to use all the interference margin at this location.

Figure 6A:
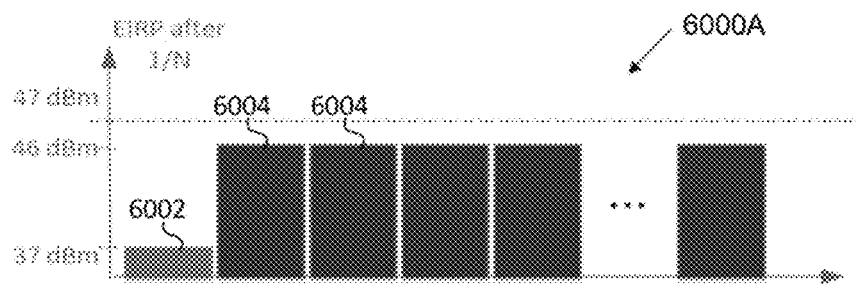
FIGS. 6A-6D provide bar graphs related to the Effective Isotropic Radiated Power ("EIRP") of various access points, according to an embodiment of the disclosed subject matter.
Figure 6B:
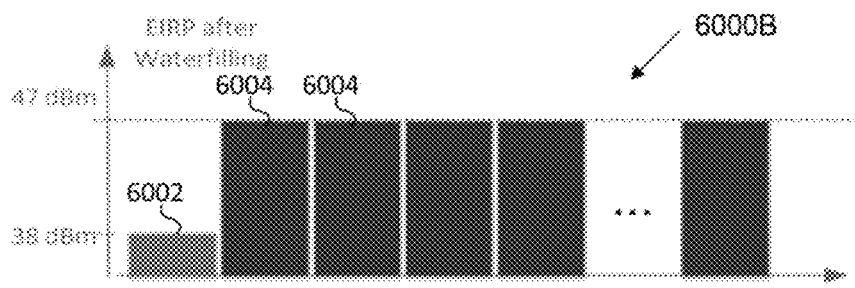

However, further distributions of any remaining leftover margin using a 1/N methodology will not resolve the severe transmit power and coverage area deficit of the green access point 5004 as illustrated in FIGS. 6A and 6B. Specifically, FIG. 6A provides a first bar graph 6000A of the green access point EIRP 6002 and blue access point EIRPs 6004 after power assignments that allow each of the ten access points to contribute 1/N=1/10 to the aggregate interference at location 5008, where the green access point 5004 is assigned 37 dBm while the each of the nine blue access points 5006 are assigned 46 dBm. Since the interference contribution of the blue access points 5006 at location 5008 is negligible, each of the ten access points may be allowed to operate at a higher power.

FIG. 6B provides a bar graph 6000B where water filling is performed such that the EIRP of each of the ten access points is equally increased until the blue access points 5006 reach their maximum permissible power level of 47 dBm. Generally, water filling refers to a method of distributing power that resembles the way water finds its level when filled in one part of a vessel with multiple openings/bins. In FIG. 6B, for SAS management of access points with limited water holding capacity (or in this case limited EIRP), water filling equally distributes the leftover margin to all access points under the constraint that a certain access point's total EIRP is capped at a certain level which may differ across access points. That is, water (or in this case the leftover margin) fills up to that point, is capped, and then continues to fill the other bins (or in this case the other access points). In other words, the leftover margin is distributed to access points up to the EIRP limit of each access point.

As illustrated in FIG. 6B, after water filling, the EIRP of the green access point 5004 is increased by 1 dBm from 37 dBm to 38 dBm, which does little to ameliorate the coverage gap for the green access point 5004. In contrast, the nine blue access points 5006, which did not have significant coverage gap, also have their EIRPs increased by 1 dBm from 46 dBm to 47 dBm, thus consuming most of the leftover margin without providing significant coverage gain.

Figure 6C:
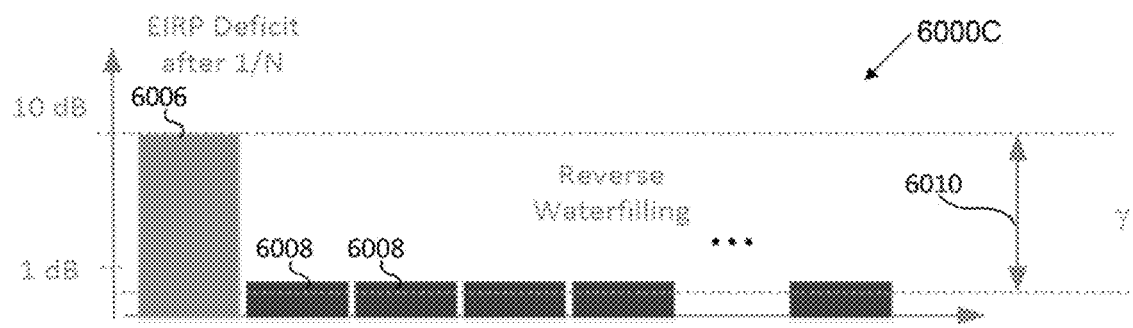
Figure 6D:
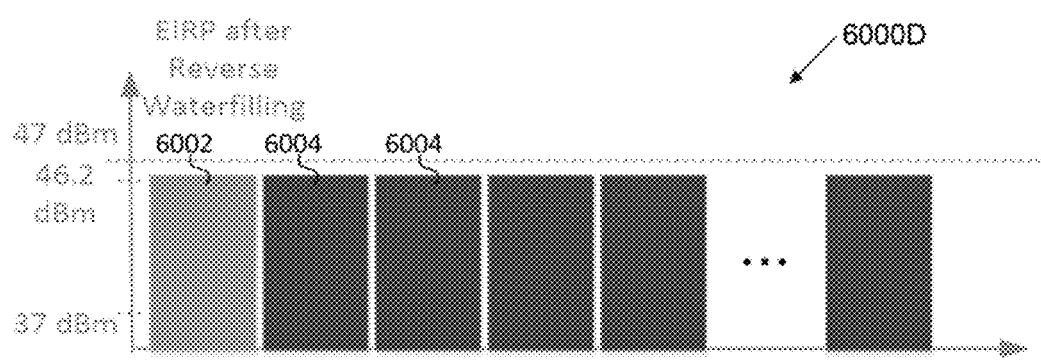

In one embodiment, the coverage area deficit of the green access point 5004 may be ameliorated using "reverse water filling" as shown in FIGS. 6C and 6D. Reverse water filling is different than water filling in that now water (or in this case the leftover margin) is first given to access points with the largest EIRP deficit with the goal of equalizing the EIRP deficit across access points. After reverse water filling, the deficit would be the same for all access points as shown in FIG. 6D. In some embodiments, with reverse water filling, there may be more leftover margin than the bins can take before overflowing (i.e., the EIRP deficit may be reduced to zero for all access points and there is still some remaining leftover margin to distribute).

Specifically, after the initial 1/N allocation illustrated in FIG. 6A, the green access point 5004 has an EIRP deficit of 10 dBm while each of the blue access points 5006 have an EIRP deficit of 1 dBm. FIG. 6C provides a bar graph 6000C of a 10 dBm green access point EIRP deficit 6006 and 1 dBm blue access point EIRP deficits 6008. Denoting by $C_i$ the EIRP deficit (in dB) before reverse water filling for the $i^{th}$ access point (47 dBm−37 dBm=10 dBm for the green access point 5004 and 47 dBm−46 dBm=1 dBm for the blue access points 5006), the level γ of reverse water filling 6010 is then chosen so that the EIRP deficit after water filling for each access point is min (γ, $C_i$) and the resulting interference increase at location 5008 due to the reverse water filling process equals the leftover aggregate interference margin at location 5008. As such, any leftover margin is allocated first to access points with the most severe coverage deficit, in this case, the green access point 5004. FIG. 6D provides a bar graph 6000D where the reverse water filling reduces the EIRP deficit to min (γ, $C_i$) where γ is chosen so that the resulting interference increase equals the leftover aggregate interference margin at location 5008.

Figure 7:
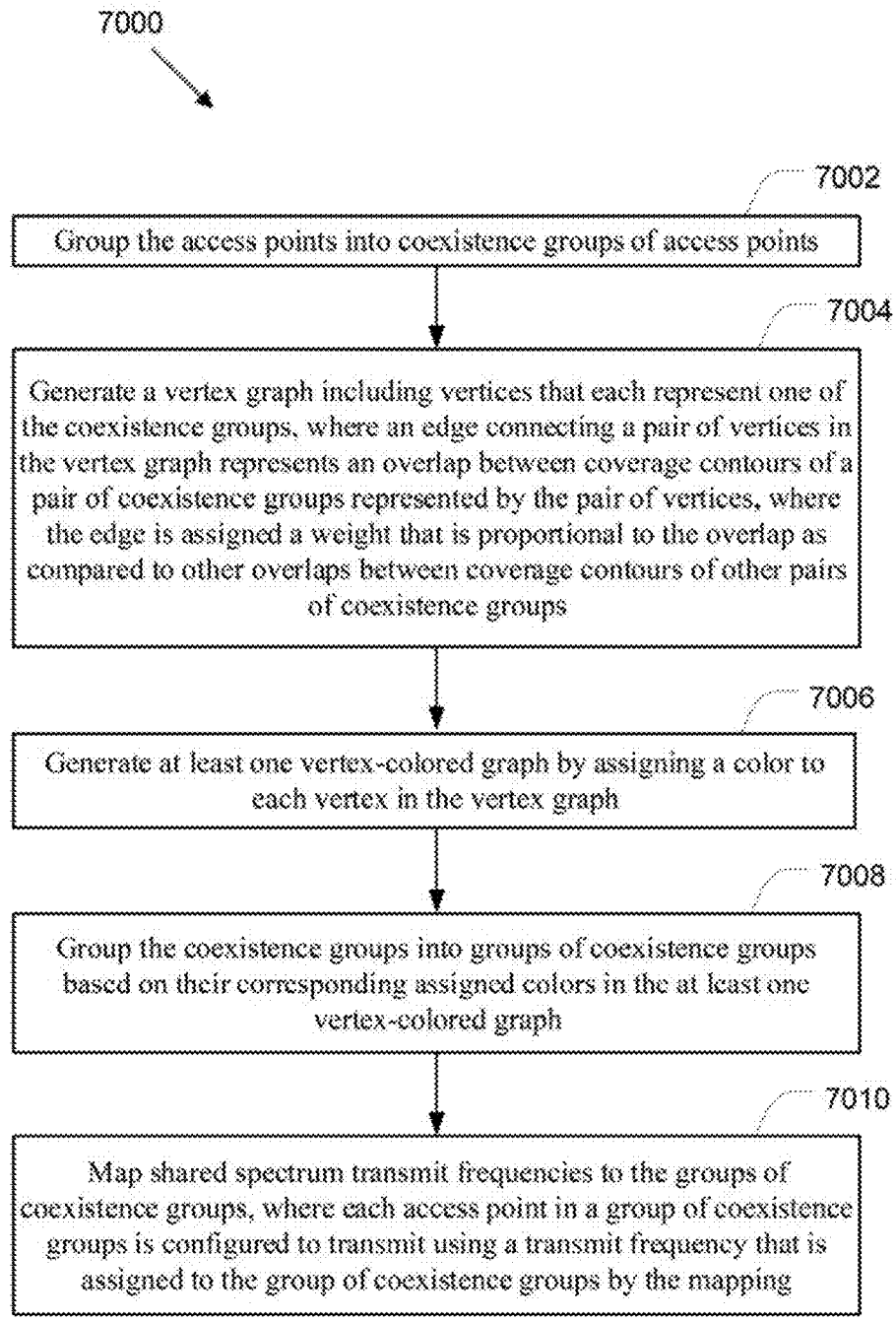
FIG. 7 is a flowchart for assigning shared spectrum resources to various access points, according to an embodiment of the disclosed subject matter.

FIG. 7 is a flowchart for assigning shared spectrum resources to various access points, according to an embodiment of the disclosed subject matter. In various embodiments, the method may be executed by one or more processor or microprocessors, microcontroller devices, or control logic including integrated circuits such as application-specific integrated circuits (ASICs). In some embodiments, the method may be executed in a cloud platform by one or more processors executing one or more software modules.

At 7002 the access points are grouped into coexistence groups of access points, and at 7004 a vertex graph including vertices that each represent one of the coexistence groups is generated. In one embodiment, an edge connecting a pair of vertices in the vertex graph represents an overlap between coverage contours of a pair of coexistence groups represented by the pair of vertices. In one embodiment, the edge is assigned a weight that is proportional to the overlap as compared to other overlaps between coverage contours of other pairs of coexistence groups.

At 7006 at least one vertex-colored graph is generated by assigning a color to each vertex in the vertex graph, and at 7008 the coexistence groups are grouped into groups of coexistence groups based on their corresponding assigned colors in the at least one vertex-colored graph. At 7010 shared spectrum transmit frequencies are mapped to the groups of coexistence groups, where each access point in a group of coexistence groups is configured to transmit using a transmit frequency that is assigned to the group of coexistence groups by the mapping.

In some embodiments the mapping of the shared spectrum transmit frequencies to the groups of coexistence groups is performed based on an objective function. In some embodiments, a transmit power level is assigned to each access point using the at least one vertex-colored graph along with the objective function. The objective function may have objective parameters including access point bandwidth and coverage areas, wherein the objective function increases as the objective parameters increase. The objective function may also have cost parameters including interference costs and switching costs, where the objective function decreases as the cost parameters increase, The switching cost may be indicative of a negative impact of a candidate assignment requiring an access point to change transmit frequency or power. The interference costs may depend at least partly on weights assigned to edges in the at least one vertex-colored graph. The objective function may also account for constraints including minimum access point bandwidth, minimum access point transmit power, incumbent protection, or guard bands between access point frequency assignments.

In some embodiments, the method is performed by at least one SAS implemented as one or more software modules on a cloud platform. In some embodiments, the method is performed by coordination of at least two SASs that share information to generate the at least one vertex-colored graph, where the SASs use the at least one vertex-colored graph along with a single common objective function to assign frequency and transmit power levels to access points. The shared information may include weights of edges in the at least one vertex-colored graph.

In some embodiments, all coexistence groups in a same group of coexistence groups have a same assigned color in the at least one vertex-colored graph. In some embodiments, no edge of the at least one vertex-colored graph is connecting two vertices that have a same assigned color. In some embodiments, the vertices are colored by determining a chromatic number and determining vertex colorings corresponding to the chromatic number.

In some embodiments, the vertex graph includes two or more connected sets, where vertices in each connected set are colored independently of other connected sets to generate two or more vertex-colored graphs. In these embodiments, the grouping of the coexistence groups is performed separately on each of the two or more vertex-colored graphs. In some embodiments, the mapping of the shared spectrum transmit frequencies to the groups of coexistence groups is performed based on an objective function, and in each connected set, a transmit power level is assigned to each access point using a corresponding vertex-colored graph along with the objective function.

In some embodiments, the two or more connected sets are created by applying at least one cut on the vertex graph. In some embodiments, the at least one cut is a minimum cut of the vertex graph along a set of edges with a lowest aggregate edge weight. In some embodiments, the at least one vertex-colored graph is used along with the objective function to maximize bandwidth and coverage area of the access points while minimizing interference to an incumbent device. In some embodiments, the at least one vertex-colored graph is used along with the objective function to maximize bandwidth and coverage area of the access points while minimizing interference to locations in a protected area.

In some embodiments, the at least one vertex-colored graph is used along with the objective function to maximize bandwidth and coverage area of the access points without minimizing interference to an incumbent device. In these embodiments, after maximizing bandwidth and coverage area of the access points without minimizing interference to an incumbent device, access point transmit power levels are adjusted to minimize an aggregate interference to an incumbent device. The access point transmit power levels may be adjusted by applying a fairness criterion where each access point is permitted to contribute 1/N to the aggregate interference to the incumbent device, where N is the number of access points interfering with the incumbent device.

The access point transmit power levels may further be adjusted by, after applying the fairness criterion to compute an initial fair power allocation and using the fair power allocations across all access points to compute the initial aggregate interference to the incumbent device, determining a leftover margin on the aggregate interference to the incumbent device, determining EIRP deficits for each access point based on access point requested transmit power levels (i.e., the power levels that the access points request from a corresponding managing SAS) and power determined by applying the fairness criterion, and applying a level of reverse water filling of power over the access points such that: (A) the EIRP deficit after the reverse water filling is the same for all access points, and (B) the resulting aggregate interference increase at the incumbent device after the reverse water filling is less than or equal to the leftover margin.

As disclosed, embodiments provide SAS functionality to conduct resource assignment across coexistence groups of access points. The SAS functionality may include combining two or more coexistence groups to use the same channel, determining fair bandwidth allocation to the coexistence group combination, mapping the bandwidth allocation to specific frequencies, choosing fair power assignment for each access point, and sharing information with other SASs to coordinate resource assignments. These functionalities may be performed jointly or separately.

Any functionality disclosed herein with reference to various embodiments may be implemented by a server/computer which may be a personal computer or workstation or other such computing system that includes a processor. However, alternative embodiments may implement more than one processor and/or one or more microprocessors, microcontroller devices, or control logic including integrated circuits such as ASIC. A bus may provide communication among various modules of the server/computer such as a processor and a memory so that the processor may executes instructions stored on the memory. The instructions may be compiled from source code/objects in a programming language such as Java, C++, C#, .net, Visual Basic™ language, LabVIEW, or another structured or object-oriented programming language. The memory may removable or non-removable, and may include any volatile or non-transitory computer-readable medium that can be read by the server/computer such as ROM, PROM, EEPROM, RAM, flash memory, disk drive, etc.

The systems and methods described above may be implemented by any hardware, software, or a combination of hardware and software having the above-described functions. The software code, either in its entirety or a part thereof, may be stored in a computer-readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method for assigning shared spectrum resources to access points, comprising:
   grouping the access points into coexistence groups of access points;
   generating a vertex graph including vertices that each represent one of the coexistence groups, wherein a connection in the vertex graph between a pair of the vertices representing a pair of the coexistence groups is assigned a weight based on an amount of interference between the pair of the coexistence groups;
   generating at least one vertex-colored graph by assigning a color to each vertex in the vertex graph;
   grouping the coexistence groups into groups of coexistence groups based on their corresponding assigned colors in the at least one vertex-colored graph; and
   mapping shared spectrum transmit frequencies to the groups of coexistence groups, wherein each access point in a group of coexistence groups is configured to transmit using a transmit frequency that is assigned to the group of coexistence groups by the mapping.

2. The method of claim 1, wherein the mapping of the shared spectrum transmit frequencies to the groups of coexistence groups is performed based on an objective function, the method further comprising:
   assigning a transmit power level to each access point using the at least one vertex-colored graph along with the objective function.

3. The method of claim 2, wherein the objective function has objective parameters including access point bandwidth and coverage areas, wherein the objective function increases as the objective parameters increase.

4. The method of claim 2, wherein the objective function has cost parameters including interference costs and switching costs, wherein the objective function decreases as the cost parameters increase, wherein the switching cost is indicative of a negative impact of a candidate assignment requiring an access point to change transmit frequency or power, wherein the interference costs depend at least partly on weights assigned to the connections in the at least one vertex-colored graph.

5. The method of claim 2, wherein the objective function accounts for constraints including minimum access point bandwidth, minimum access point transmit power, incumbent protection, or guard bands between access point frequency assignments.

6. The method of claim 1, wherein the method is performed by at least one Spectrum Access System (SAS) implemented as one or more software modules on a cloud platform.

7. The method of claim 1, wherein the method is performed by coordination of at least two Spectrum Access Systems (SASs) that share information to generate the at least one vertex-colored graph, wherein the SASs use the at least one vertex-colored graph along with a single common objective function to assign frequency and transmit power levels to access points, wherein the shared information includes the weights of the connections in the at least one vertex-colored graph.

8. The method of claim 1, wherein all coexistence groups in a same group of coexistence groups have a same assigned color in the at least one vertex-colored graph, wherein no connection of the at least one vertex-colored graph is connecting two vertices that have a same assigned color.

9. The method of claim 1, wherein the vertices are colored by determining a chromatic number and determining vertex colorings corresponding to the chromatic number.

10. The method of claim 1, wherein the vertex graph comprises two or more connected sets, wherein vertices in each connected set are colored independently of other connected sets to generate two or more vertex-colored graphs, wherein the grouping of the coexistence groups is performed separately on each of the two or more vertex-colored graphs.

11. The method of claim 10, wherein the mapping of the shared spectrum transmit frequencies to the groups of coexistence groups is performed based on an objective function, the method further comprising:
   in each connected set, assigning a transmit power level to each access point using a corresponding vertex-colored graph along with the objective function.

12. The method of claim 10, wherein the two or more connected sets are created by applying at least one cut on the vertex graph, wherein the at least one cut is a minimum cut of the vertex graph along a set of the connections with a lowest aggregate connection weight.

13. The method of claim 2, wherein the at least one vertex-colored graph is used along with the objective function to maximize bandwidth and coverage area of the access points while minimizing interference to locations in a protected area.

14. The method of claim 2, wherein the at least one vertex-colored graph is used along with the objective function to maximize bandwidth and coverage area of the access points while minimizing interference to an incumbent device.

15. The method of claim 2, wherein the at least one vertex-colored graph is used along with the objective function to maximize bandwidth and coverage area of the access points without minimizing interference to an incumbent device.

16. The method of claim 15, wherein, after maximizing bandwidth and coverage area of the access points without minimizing interference to an incumbent device, access point transmit power levels are adjusted to minimize an aggregate interference to an incumbent device.

17. The method of claim 16, wherein the access point transmit power levels are adjusted by applying a fairness criterion where each access point is permitted to contribute 1/N to the aggregate interference to the incumbent device, wherein N is the number of access points interfering with the incumbent device.

18. The method of claim 17, wherein the access point transmit power levels are further adjusted by:
   after applying the fairness criterion, determining a leftover margin on the aggregate interference to the incumbent device;
   determining Effective Isotropic Radiated Power (EIRP) deficits for each access point based on access point requested transmit power levels and the power determined by applying the fairness criterion; and
   applying a level of reverse water filling of power over the access points such that: (A) the EIRP deficit after the reverse water filling is the same for all access points, and (B) the resulting aggregate interference increase at the incumbent device after the reverse water filling is less than or equal to the leftover margin.

19. A non-transitory computer-readable medium storing instructions that, when executed by a processor, cause the processor to assign shared spectrum resources to access points, the assigning comprising:

grouping the access points into coexistence groups of access points;

calculating an amount of interference between the coexistence groups;

generating a vertex graph including vertices that each represent one of the coexistence groups, wherein a connection in the vertex graph between a pair of the vertices representing a pair of the coexistence groups is assigned a weight based on an amount of interference between the pair of the coexistence groups;

generating at least one vertex-colored graph by assigning a color to each vertex in the vertex graph;

grouping the coexistence groups into groups of coexistence groups based on their corresponding assigned colors in the at least one vertex-colored graph; and mapping shared spectrum transmit frequencies to the groups of coexistence groups, wherein each access point in a group of coexistence groups is configured to transmit using a transmit frequency that is assigned to the group of coexistence groups by the mapping.

20. A network system, comprising:

one or more servers; and two or more Spectrum Access Systems (SASs) implemented as software modules hosted on the one or more servers, wherein the two or more SASs are configured to communicate with each other and with access points to assign shared spectrum resources to the access points, the assigning comprising:

grouping the access points into coexistence groups of access points;

calculating an amount of interference between the coexistence groups;

generating a vertex graph including vertices that each represent one of the coexistence groups, wherein a connection in the vertex graph between a pair of the vertices representing a pair of the coexistence groups is assigned a weight based on an amount of interference between the pair of the coexistence groups;

generating at least one vertex-colored graph by assigning a color to each vertex in the vertex graph;

grouping the coexistence groups into groups of coexistence groups based on their corresponding assigned colors in the at least one vertex-colored graph; and mapping shared spectrum transmit frequencies to the groups of coexistence groups, wherein each access point in a group of coexistence groups is configured to transmit using a transmit frequency that is assigned to the group of coexistence groups by the mapping.

21. The network system of claim 20, wherein the weight assigned to the connection between the pair of the coexistence groups is further based on a comparison of the interference between the pair of the coexistence groups as against an amount of interference between another pair of the coexistence groups.

22. The non-transitory computer-readable medium of claim 19, wherein the weight assigned to the connection between the pair of the coexistence groups is further based on a comparison of the interference between the pair of the coexistence groups as against an amount of interference between another pair of the coexistence groups.

23. The method of claim 1, wherein the weight assigned to the connection between the pair of the coexistence groups is further based on a comparison of the interference between the pair of the coexistence groups as against an amount of interference between another pair of the coexistence groups.

* * * * *